United States Patent [19]

Dreher et al.

[11] Patent Number: 4,756,916

[45] Date of Patent: Jul. 12, 1988

[54] PROCESS FOR PRODUCING LOW OIL POTATO CHIPS

[75] Inventors: Mark Dreher, Highland Village; David Duval, Arlington; David L. Budd, Plano; Lawrence W. Wisdom, Dallas; James C. Wisniewski, Irving, all of Tex.

[73] Assignee: Frito-Lay, Inc., Dallas, Tex.

[21] Appl. No.: 102,654

[22] Filed: Sep. 30, 1987

[51] Int. Cl.$^4$ ............................................. A23L 1/217
[52] U.S. Cl. .................... 426/302; 426/438; 426/441; 426/523; 426/637
[58] Field of Search ............... 426/438, 441, 523, 302, 426/637

[56] References Cited

U.S. PATENT DOCUMENTS

| | | | |
|---|---|---|---|
| 2,286,644 | 6/1942 | Pringle et al. | 426/438 |
| 3,044,880 | 7/1962 | Bogyo et al. | 426/438 X |
| 3,205,074 | 9/1965 | Nack et al. | |
| 3,244,538 | 4/1966 | Kachler | |
| 3,353,962 | 11/1967 | Smith | 426/438 |
| 3,402,049 | 9/1968 | Mancuso et al. | |
| 3,436,229 | 4/1969 | Simpson | 426/438 |
| 3,597,239 | 8/1971 | Vahlsing | 426/438 X |
| 3,627,535 | 7/1969 | Davidson et al. | |
| 3,846,572 | 11/1974 | Nonaka et al. | 426/429 |
| 4,134,998 | 1/1979 | Liebermann | 426/438 |
| 4,156,744 | 5/1979 | Kiploks et al. | 426/637 |
| 4,269,861 | 5/1981 | Caridis et al. | 426/438 |
| 4,277,510 | 7/1981 | Wicklund et al. | 426/441 |
| 4,283,425 | 8/1981 | Yuan et al. | 426/102 |
| 4,517,204 | 5/1985 | Mottur et al. | 426/94 |
| 4,537,786 | 8/1985 | Bernard | 426/438 |
| 4,542,030 | 9/1985 | Haury et al. | 426/262 |
| 4,547,376 | 10/1985 | Silver et al. | 426/102 |
| 4,608,264 | 8/1986 | Fan et al. | 426/438 |

FOREIGN PATENT DOCUMENTS

| | | |
|---|---|---|
| 229038 | 10/1958 | Australia . |
| 836481 | 3/1970 | Canada . |
| 900266 | 5/1972 | Canada . |
| 1151945 | 8/1983 | Canada . |
| 1034035 | 6/1966 | United Kingdom . |
| 1133929 | 11/1968 | United Kingdom . |

OTHER PUBLICATIONS

Baroudi, A., "Evaluation of Factors Affecting Color and Acceptance of Potato Chips", Ohio State University (1978) pp. 36–38, 41,61,103,105,107,131.

Shaw et al., "Reducing the Oil Content of Potato Chips by Controlling Their Temperatures After Frying", USDA, 5-1968, pp. 1–9.

Primary Examiner—Arthur L. Corbin
Attorney, Agent, or Firm—Bernard, Rothwell & Brown

[57] ABSTRACT

Low oil potato chips are produced by washing potato slices with an aqueous solution and applying oil to the washed slices to at least partially coat the slices with oil. The oil-coated slices are blanched at a temperature of about 70°–100° C. (about 160°–212° F.), and then baked at a high temperature of at least about 200° C. (about 390° F.) but below the smoke point of the oil, to partially dry the slices to an aqueous moisture content of about 10–25 weight percent. The partially dried slices are further baked at a low temperature of about 145°–160° C. (about 290°–320° F.) to finish drying the slices to an aqueous moisture content of about 2 weight percent or less.

27 Claims, 3 Drawing Sheets

PROCESS FOR PRODUCING LOW OIL POTATO CHIPS

BACKGROUND OF THE INVENTION

1. Field of the Invention

The present invention relates to a process for producing low oil potato chips.

2. Description of the Background Art

Potato chips are popular snack items that typically are prepared by frying potato slices in hot oil until the aqueous moisture content of the slices is reduced to about 2% by weight or less. Fried potato chips prepared using conventional methods usually have an oil or fat content of from about 35% to about 40% by weight or more.

In recent years, a significant consumer interest has developed in weight control and reduced intake of fats and oils. Because of the high fat or oil content of conventionally prepared potato chips, a substantial portion of the total calories therein present derives from the fat or oil in the product.

There have been numerous proposals in the prior art for reducing the amount of oil in potato chips. For example, British Patent Specification No. 1,133,929 describes a method of making potato chips by frying potato slices at about 300° F. to remove part of the aqueous moisture, and finish drying the slices in dry air at subatmospheric pressure. U.S. Pat. No. 3,353,962 discloses another method involving frying slices to partially remove the aqueous moisture, and then finish drying the slices with radiant energy. British Patent Specification No. 1,034,035 describes still another method involving frying potato slices to partially remove the aqueous moisture, and thereafter finish drying the chips in a layer with hot air moving upwards through the layer at low velocity. U.S. Pat. No. 3,402,049 discloses a process for preparing low fat potato chips wherein raw potato slices are soaked in an edible fat, the fat is drained from the slices to remove excess fat, and the potato slices are subjected to an elevated temperature to surface-fry and dehydrate the potato slices. U.S. Pat. No. 4,277,510 discloses a process of making low fat potato chips wherein potato slices are dried in a monolayer by exposing both surfaces of the slices to contact with a gaseous atmosphere under drying conditions to reduce the aqueous moisture content of the slices to about 30-65% by weight, contacting the partially dried potato slices with steam under conditions that avoid rehydration of the slices, and frying the steam-treated potato slices to provide potato chips of relatively low oil content. Other methods for reducing the fat content of fried foods are disclosed in U.S. Pat. Nos. 3,244,538, 3,627,535; 3,846,572; 4,283,425; and 4,537,786, Canadian Pat. Nos. 836,481 and 1,151,945, and a publically available thesis summarizing various methods of frying potato chips, including vacuum drying of the chips. Baroudi, A., *Evaluation of Factors Affecting Color and Acceptance of Potato Chips*, Ohio State University (1978).

Despite the numerous proposals for reducing the oil content of potato chips, low oil potato chips prepared using previously known processes often have one or more drawbacks that may include undesirable texture, flavor or color characteristics. Also, the previously known processes for preparing the low oil potato chips generally are not economically feasible for large scale commercial potato chip production. Accordingly, there remains a need in the art for an economical and efficient process for producing high quality low oil potato chips.

SUMMARY OF THE INVENTION

In accordance with the present invention, a process for producing low oil potato chips comprises washing potato slices with an aqueous solution, and applying oil to the washed slices to coat the slices with oil. The oil-coated slices are blanched at a temperature between about 70° C. (160° F.) and 100° C. (212° F.), and then baked at a high temperature of at least about 200° C. (about 390° F.) but below the smoke point of the oil, to partially dry the slices by reducing the aqueous moisture content of the slices to about 10-20% by weight. The partially dried slices then are further baked at a lower temperature of about 145°-160° C. (about 290°-320° F.) to finish drying the slices by reducing the aqueous moisture content of the slices to about 2% by weight or less, to produce a product having an oil content of between about 10-25 weight percent and with texture, flavor and color characteristics of conventional fried potato chips.

DETAILED DESCRIPTION OF THE PREFERRED EMBODIMENTS

Figure 1:
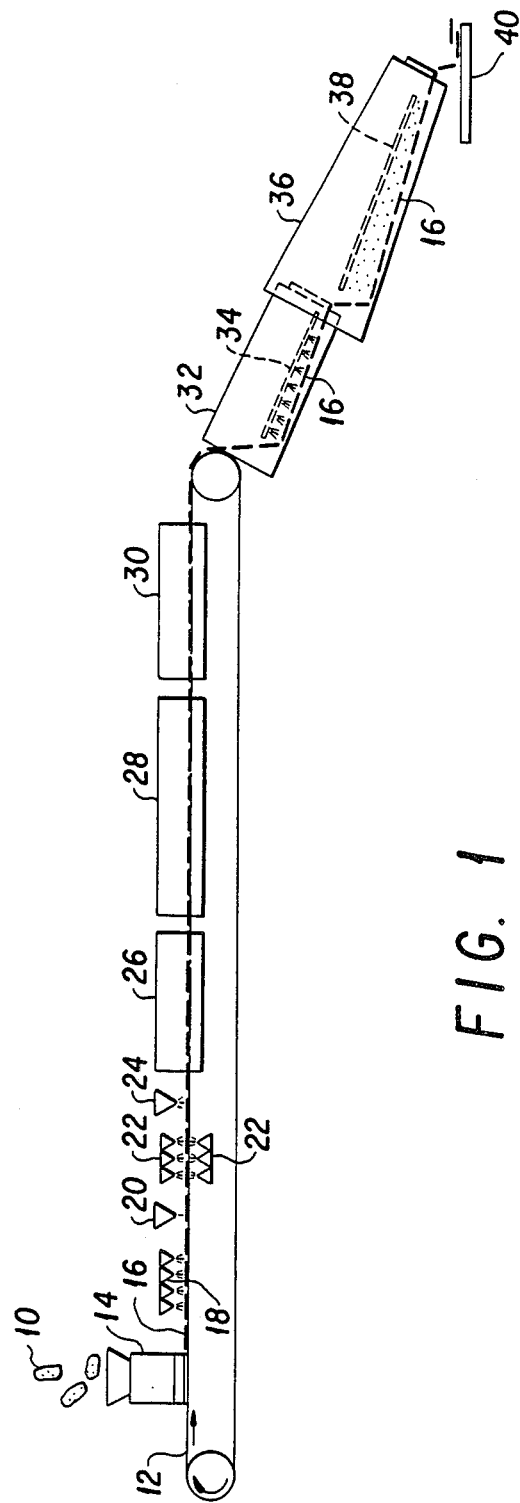
FIG. 1 schematically illustrates the production of low oil potato chips according to one embodiment of the present invention.
Figure 2:
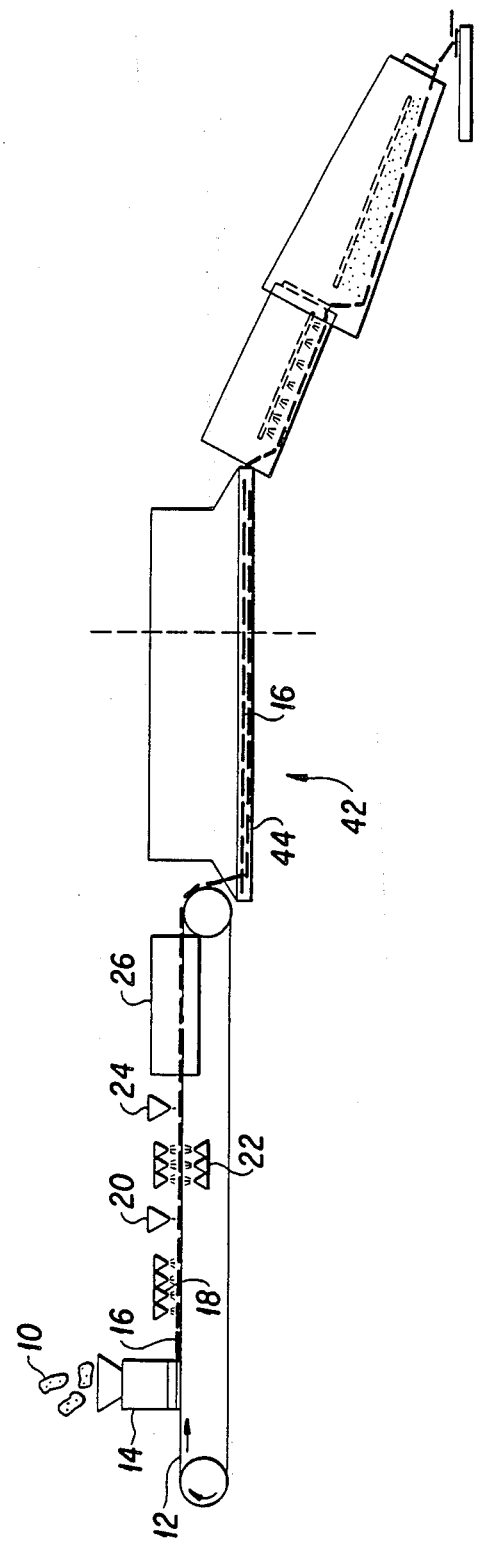
FIG. 2 schematically illustrates the production of low oil potato chips according to another embodiment of the present invention.

The production of low oil potato chips in accordance with the present invention is schematically illustrated in FIGS. 1 and 2. Raw potatoes 10, which may be peeled or unpeeled, are sliced and monolayered on an endless conveyor belt 12 by a vegetable slicing and monolayering device 14. One example of a suitable slicing and monolayering device 14 is a modified Urschel TM centrifugal slicer that has been adapted for monolayering vegetable slices 16 as disclosed in commonly owned, copending U.S. patent application Ser. No. 713,896, filed Mar. 20, 1985.

Although the embodiments shown in FIGS. 1 and 2 are schematically illustrated with a single conveyor belt 12, it is to be understood that the invention may be practiced with any suitable number of conveyor belts.

Suitable slice thicknesses are within the range of about 1-2 millimeters (about 0.045-0.08 inch), preferably within the range of from about 1¼ and 1⅓ millimeters (about 0.05-0.06 inch).

The monolayered slices 16 on conveyor belt 12 are passed beneath nozzles 18 that spray the slices with an aqueous solution, such as tap water, to wash the slices. This slice washing step not only reduces the stickiness of the slices as has been shown in the prior art, but surprisingly, when combined with the other steps of the process of the present invention, reduces the hardness of the final product and significantly decreases both the final product color and the strength of the "GREEN" or "EARTHY" flavor sometimes found in potato products. The resulting product is similar in texture, color and flavor to conventional fried potato chips having considerably higher oil content.

If desired, after spray washing the slices, excess washing solution that has collected on the monolayered slices 16 can be blown off with a blast of air from a device such as an air knife 20 at an air pressure of, for example, 1-4 psig. Oil then is applied to the washed, monolayered slices in the form of an oil spray or oil mist from nozzles 22 to at least partially coat the slices with oil. Suitable oils include partially hydrogenated mixtures of cottonseed and soybean oils with a Wiley melting point of about 35° C. (about 95° F.). If desired, monoglycerides can be added to the spraying oil at a level of 0.2-1.0% by weight to complex with the amylose starch fraction and further reduce the hardness of the final product.

Oil addition before baking is necessary for the proper development of fried potato chip flavors. If oil is only added after baking, chip texture is hard and the fried potato chip flavor is not developed. These differences are illustrated in Example 4, following.

The amount of oil applied to the washed, monolayered slices is adjusted to achieve an oil content of about 10-25 weight percent in the final product. Preferably, the amount of oil applied is adjusted to achieve an oil content of about 12-16% by weight of the finished product. If necessary, excess oil can be removed from the slices by blowing oil off of the monolayered slices, as with a blast of air from air knife 24 at an air pressure of, for example, 1-4 psig, to achieve the 10-25 weight percent oil content of the final product.

The oil-coated, monolayered slices on the conveyor then are passed through a blancher 26 that blanches the slices at a temperature of 70°-100° C. (about 160°-212° F.) for about 1-2 minutes. Blanching can be accomplished in a number of ways, including the use of steam, superheated steam, hot water, hot oil, microwaves, or other suitable means. Preferably, the monolayered slices are steam blanched at a temperature of about 90°-100° C. (about 195°-212° F.) in blancher 26.

The blanching step, when combined with the other steps of the process of this invention, has been found to significantly improve the flavor and texture of the final product. It is believed that blanching may remove from the slices, by distillation, the pyrazines that are associated with raw or green potato flavors. Also, the solubilization of intercellular pectin by blanching may increase puffing an thereby result in a softer final product texture.

In the embodiment illustrated in FIG. 1, after steam blanching, the monolayered, oil-coated slices are baked in a pass-through oven 28 at a high temperature of about 200° C. (about 390° F.) to partially dry the slices by reducing the aqueous moisture content of the slices to about 10-20% by weight, preferably to about 15% aqueous moisture by weight. A non-oxidizing atmosphere is recommended to prevent deterioration of the oil. Drying can be most beneficially accomplished by using superheated steam. Prior to the high temperature baking step, the slices have an aqueous moisture content of up to 80% by weight or more. The high temperature baking step provides rapid removal of aqueous moisture from the slices, during which puffing of the slices is initiated after the aqueous moisture content is reduced to approximately 35% by weight. A particularly preferred baking temperature for the high temperature bake is about 218° C. (about 425° F.) according to this embodiment, with a baking time of about 4-6 minutes.

Generally, the slices are dried in air or, optionally, in an atmosphere of superheated steam, for about 5-6 minutes during the high temperature baking step. The slices are baked at a temperature below the smoke point of the oil, which generally is about 220°-230° C. (about 430°-445° F.) to avoid any undesirable flavors resulting from oil degradation. In spite of the relatively high temperatures employed in this step, oil quality is not affected. Peroxide values after the second drying stage described below are typically below 6 meq/kilogram.

According to the embodiment illustrated in FIG. 1, after high temperature baking in oven 28, the monolayered, partially dried slices having an aqueous moisture content of about 10-20% by weight, are further baked in pass-through oven 30 at a lower temperature of about 145°-160° C. (about 290°-320° F.), to finish drying the slices to an aqueous moisture content of about 2% by weight or less. Preferably, the low temperature baking in oven 30 is at a temperature of about 150°-160° C. (about 300°-320° F.), with a baking time of about 2.5-3.5 minutes. According to this embodiment, the baking temperature of the low temperature baking step is most preferably about 155° C. (about 310° F.).

The low temperature baking step in oven 30 provides for the gentle removal of final moisture, and the development of Maillard reaction products for desired color and flavor development. The process of the present invention can be utilized to produce a baked potato chip product having texture, color and flavor characteristics of conventional fried potato chips, but with an oil content ⅓ to ½ lower than conventional fried potato chips. Accordingly, the process of the present invention can be utilized to produce potato chips having an oil content of less than about 25% by weight, preferably less than about 20% by weight, and most preferably about 17.5% by weight.

In the embodiment illustrated in FIG. 1, chips are sprayed with sufficient oil to achieve an oil content of about 1.5-5 weight percent (wet basis) prior to entering the first drying chamber. This results in an oil content of about 10-25 weight percent (dry basis) after the chips are dried (i.e., after exiting the second drying chamber). Normally it is preferable to add additional oil to the chips after baking, to control the oil content of the chips at a desired level and to assure that oil content is uniform and in compliance with regulatory agency requirements. Advantages of adding a portion of the oil after the baking step include: (1) better control of flavor development during the high temperature bake, (2) less oil is removed during the blanching step, and (3) less oil is lost or degraded on conveyor 12. Optionally, additional oil can be added to the chips by depositing the warm chips into rotating tumbling drum 32 and spraying oil on the chips with sprayer 34 during cooling of the chips, to minimize any variance in their oil content. The chips then are passed into rotating seasoning tumbler 36 where the chips are salted and/or seasoned during tumbling by seasoner 38 prior to being deposited onto conveyor 40 for packaging.

Spraying oil onto the surface of the baked chips with sprayer 34 not only minimizes batch-to-batch variance, but also improves adhesion of salt and seasoning to the chips. If desired, salt and/or seasoning can be applied to the chips in tumbler 32 simultaneously with the application of additional oil to the chips.

FIG. 2 schematically illustrates another embodiment of the invention wherein the same reference numerals as in FIG. 1 are utilized for those features of this embodiment that are the same as illustrated in FIG. 1. In this embodiment, as above, raw potatoes 10, which may be peeled or unpeeled are sliced and monolayered onto conveyor 12 by the slicing/monolayering device 14. The monolayered slices then are spray washed with an aqueous solution by nozzles 18, and excess solution is removed by air knife 20 prior to oil being sprayed on the slices by oil nozzles 22. Excess oil is optionally removed from the oil-coated slices by air knife 24, and the oil-coated, monolayered slices are blanched in blancher 26 at a temperature of about 70°-100° C. (about 160°-212° F.) for about 1-2 minutes. Preferably, the monolayered slices are steam blanched at a temperature of about 90°-100° C. (about 195°-212° F.) in blancher 26.

According to this embodiment, after exiting blancher 26, the slices 16 are dried by a fluidized bed process, rather than passing in a monolayer fashion through high temperature and low temperature ovens. The monolayered slices are deposited into a fluidized bed oven 42 to form a multi-layer fluidized bed 44 of slices 16.

The oil-coated slices are baked in the multi-layer, fluidized bed at a high temperature of at least about 200° C. (about 390° F.), but below the smoke point of the oil, to partially dry the slices by reducing the aqueous moisture content of the slices to about 10-20% by weight, preferably to about 15% by weight. The bed of slices is fluidized and baked by hot forced air or, preferably, superheated steam maintained at a temperature below the smoke point of the oil, which is generally about 220°-230° C. (about 430°-445° F.), to avoid possible undesirable flavors resulting from oil degradation.

Figure 3:
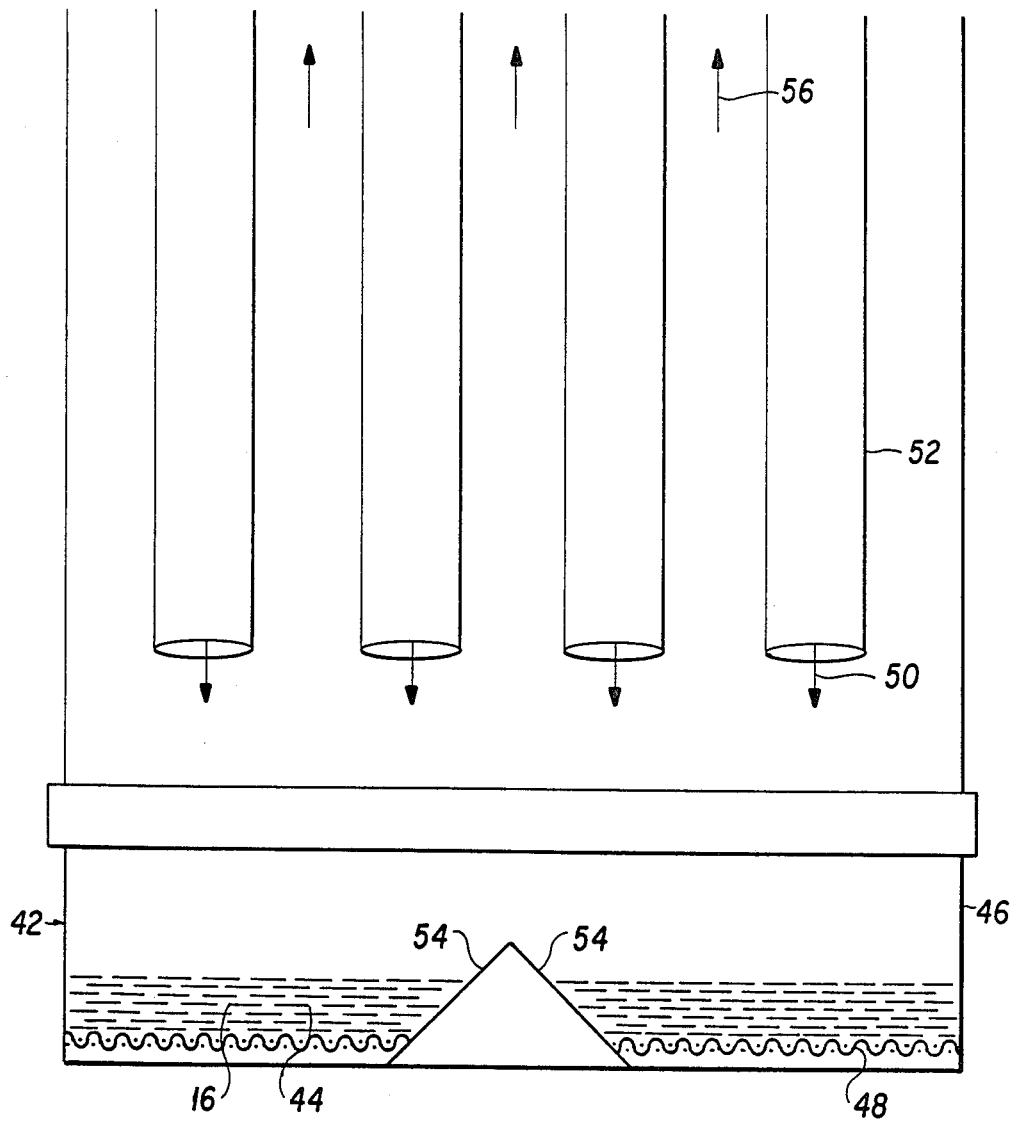
FIG. 3 schematically illustrates a laboratory scale fluidized bed oven that can be used in the production of low oil potato chips according to an embodiment of the invention schematically illustrated in FIG. 2.

A laboratory scale fluidized bed oven that is useful for practicing the invention is illustrated schematically in FIG. 3. The oven illustrated in FIG. 3 is a Wolverine Jet Zone TM oven having a pan portion 46, on the floor of which is located a Teflon TM netted mat 48, on which a multi-layered bed 44 of slices 16 is formed. Superheated steam or hot air at a temperature of, for example, 205° C. (about 400° F.) is forced downwardly in the direction of arrows 50 towards the pan 46 through tubes 52. Air-directing guide surfaces 54 assist in directing the superheated steam or hot air beneath the bed 44 of slices 16 to fluidize the bed of slices for even drying. The hot forced air exiting tubes 52 creates an upward current of exhaust air in the direction of arrows 56.

After high temperature baking to partially dry the multi-layered fluidized bed of slices to a 10-20% by weight aqueous moisture level, the slices are further baked at a low temperature of about 145°-160° C. (about 290°-320° F.) to finish drying the slices by reducing the aqueous moisture content of the slices to about 2% by weight or less. While a fluidized bed batch oven as shown in FIG. 3, the low temperature baking step can take place in the same oven 42 by simply lowering the temperature of the forced air to about 145°-160° C. (about 290°-320° F.).

Other fluidized bed ovens, such as ones that utilize superheated steam or air flow from the sides and/or bottom, are also deemed suitable for practicing the invention.

As in the previously described embodiment, oil can be sprayed onto the chips in a tumbler, if necessary to minimize batch-to-batch variance of the oil content of the chips, during cooling of the chips after being transferred from the fluidized bed oven. Chips of relatively uniform oil content then can be salted and/or seasoned.

A third embodiment combines features found in embodiments 1 and 2. In this embodiment the low temperature oven 30 of the first embodiment is replaced with the fluidized bed oven 42 of the second embodiment. This third embodiment is preferred because it reduces space requirements for the low temperature oven, increases throughput, improves economics, and is a more efficient process in general. The advantages are illustrated in Example 3.

The invention will be further illustrated by the following examples, which are not intended to be limiting.

EXAMPLE 1

Low Oil Potato Chips Produced with Monolayer Baking

Potato slices having a thickness of about 1.4 mm (about 0.055 inch) were monolayered on a moving endless conveyor belt and spray washed with water. Excess water was removed from the slices by a blast of air by passing the slices beneath an air knife, and a mixture of partially hydrogenated cottonseed and soybean oils was sprayed onto the monolayered slices. Excess oil was blown off of the oil-coated slices by an air knife. The monolayered slices were then conveyed through a steam blancher and steamed for 1-2 minutes at temperatures of about 90°-100° C. (about 194°-212° F.) to produce steam-blanched, oil-coated potato slices.

The steam-blanched, oil-coated potato slices were conveyed in a monolayer through a high temperature Enersyst TM 3-zone oven at a temperature of about 218° C. (about 425° F.) for periods of time ranging between 4.9-5.7 minutes (conveyor belt speeds of 29.0-34.0 inches per minute) to reduce the moisture content of the slices to about 15% by weight. The partially baked slices then were conveyed through a low temperature Enersyst TM 1-zone oven at about 155°C. (about 310° F.) for time periods ranging between 2.5-3.5 minutes (belt speeds of 33.0-46.0 inches per minute) to reduce the moisture content of the chips to about 2% by weight or less to produce potato chips having an oil content between 10-18% by weight.

In a consumer panel composed of at least 100 members actual sensory ratings for low oil potato chips produced as above were compared to actual sensory ratings for Lay's ® brand conventional fried potato chips in Table 1 below.

TABLE 1

|  | Low oil Product (18-21% oil) | Lay's ® Fried Product (35-40% oil) |
|---|---|---|
| Overall Acceptability (9)* | 6.7 | 6.8 |
| Appearance Acceptability (9) | 7.0 | 6.8 |
| Texture Acceptability (9) | 6.7 | 7.1 |
| Crispness (5) | 5.3 | 4.9 |
| Hardness (5) | 5.7 | — |
| Flavor Acceptability (9) | 6.8 | 6.9 |
| Oiliness (5) | 4.9 | 5.7 |
| Potato Flavor (5) | 4.7 | 5.1 |
| Oil Flavor (5) | 5.2 | — |
| Saltiness (5) | 4.9 | 6.8 |
| Aftertaste Acceptability (9) | 6.3 | 6.2 |

*Numbers in parentheses are the target values using a Hedonic scale ranging from 1-9. The value of 9 is the most desirable when measuring acceptability and the value of 5 is the most desirable when measuring intensity.

Table 1 indicates a similar degree of acceptability of low oil product according to the invention as compared to conventional Lay's ® brand fried potato chips.

EXAMPLE 2

Low Oil Potato Chips Produced with Fluidized Bed Baking

Potato slices having a thickness of about 1.4 mm (about 0.055 inch) were monolayered on a moving endless conveyor belt and spray washed with water. Excess water was removed from the slices by a blast of air by passing the slices beneath an air knife, and a mixture of partially hydrogenated cottonseed and soybean oils was sprayed on the monolayered slices. Excess oil was blown off of the oil-coated slices by an air knife. The monolayered slices were then conveyed through a steam blancher and steamed for 1-2 minutes at a temperature of about 90°-100° C. (about 194°-212° F.) to produce steam-blanched potato slices.

The steam-blanched potato slices were introduced into a laboratory scale Wolverine Jet Zone TM oven as shown schematically in FIG. 3 and described above, having a pan area of approximately 400 cm² (62 in²).

In a first test, 30 slices were bedded three deep in the 400 cm² (62 in²) pan. The slices were baked at a high temperature of about 205° C. (about 400° F.) with forced air at a velocity of 7,000 ft³/min (198 m³/min) for 10 minutes and then with 7,000 ft³/min (198 m³/min) air at a low temperature of about 150° C. (about 300° F.) for 5 minutes, with the slices being manually shaken up every 3-4 minutes. The product dried without clumping or sticking to the pan and without breakage of the slices.

In a second test, 60 slices were bedded six slices deep in the 400 cm² pan. The slices were fluidized by forced air at a velocity of 7,000 ft³/min (198 m³/min) and baked at a high temperature of about 205° C. (about 400° F.) for 18 minutes and thereafter at a low temperature of about 150° C. (about 300° F.) for 12 minutes with the slices being manually shaken up every 3-4 minutes. The product dried without clumping or sticking to the pan and without breakage of the chips.

EXAMPLE 3

Low Oil Potato Chips Produced with Both Monolayer Baking and Fluidized Bed Baking Potato slices having a thickness of about 1.4 mm (about 0.055 inch) were monolayered on a moving endless conveyor belt and spray washed with water. Excess water was removed from the slices by a blast of air by passing the slices beneath an air knife, and a mixture of partially hydrogenated cottonseed and soybean oils were sprayed on the monolayered slices. Excess oil was blown off of the oil-coated slices by an air knife. The monolayered slices were then conveyed through a steam blancher and steamed for 1-2 minutes at temperatures of about 90°-100° C. (about 194°-212° F.) to produce steam-blanched, oil-coated potato slices.

The steam-blanched, oil-coated potato slices were conveyed in a monolayer through a high temperature Enersyst TM 3-zone oven at a temperature of about 218° C. (about 425° F.) for periods of time ranging between 4.9-5.7 minutes (conveyor belt speeds of 29.0-34.0 inches per minute) to reduce the moisture content of the slices to about 15% by weight. The partially baked slices were then conveyed through a low temperature pilot plant scale Wolverine Jet Zone TM oven at a temperature of about 145° C. (about 290° F.) for time period ranging between 1.5 and 2.5 minutes. Air velocity was regulated to about 2,000 linear ft./min. to reduce the moisture content of the chips to about 2% by weight or less. Oil content of the chips at this stage was about 14% by weight. The chips were then brought up to about 18-21% oil by weight in a tumbler with an oil spray.

The advantages of adding oil to the raw potato slices before baking are illustrated in Example 4.

EXAMPLE 4

Low Oil Potato Chips Produced with Monolayer Baking

Potato slices having a thickness of about 1.4 mm (about 0.055 inch) were monolayered on a moving endless conveyor belt and spray washed with water. Excess water was removed from the slices by a blast of air by passing the slices beneath an air knife, and a mixture of partially hydrogenated cottonseed and soybean oils was sprayed on the monolayered slices. Excess oil was then blown off of the oil-coated slices by an air knife. The final oil target for the potato slice was 2% on a wet weight basis and 14% on a dry weight basis. The monolayered slices were then covered through a blancher and steamed for 1-2 minutes at a temperature of about 90°-100° C. (about 194°-212° F.) to produce steam-blanched, oil-coated potato slices.

The steam-blanched, oil-coated potato slices were conveyed in a monolayer through a high temperature Enersyst TM 3-zone oven at a temperature of about 218° C. (about 425° F.) for periods of time ranging between 4.9 and 5.7 minutes to reduce the moisture content of the slices to about 15% by weight. The partially baked slices were then conveyed through a low temperature Enersyst TM 1-zone oven at about 155° F. (about 310° F.) for time periods ranging between 2.5-3.5 minutes to reduce the moisture content of the chips to about 2% by weight or less to produce potato chips having an oil content of 14% by weight.

Actual sensory rating for low oil potato chips produced as above compared to potato chips baked without oil and adjusted to a final oil of 14% by weight in a tumbler are in Table 2 below.

TABLE 2

|  | Oil added before high temperature baking (about 14% by weight oil content finished product) | Oil added after high temperature baking (about 14% by weight oil content finished product) |
| --- | --- | --- |
| Overall Acceptability (9) | 6.3 | 5.3 |
| Appearance Acceptability (9) | 6.9 | 6.1 |
| Texture Acceptability (9) | 6.5 | 5.9 |
| Crispness (5) | 4.8 | 6.0 |
| Hardness (5) | 5.2 | 5.9 |
| Flavor Acceptability (9) | 6.5 | 5.1 |
| Oiliness (5) | 5.3 | 5.9 |
| Potato Flavor (5) | 4.1 | 4.3 |
| Oil Flavor (5) | 5.3 | 5.9 |
| Saltiness (5) | 4.5 | 4.5 |
| Aftertaste Acceptability (9) | 5.8 | 5.0 |

In a consumer panel of at least 100 members, these samples were found to be significantly different at the 99% confidence level on all qualities except potato flavor and saltiness.

Since many modifications, variations and changes in detail can be made to the described embodiments, it is intended that all matter in the foregoing description and shown in the accompanying drawings be interpreted as illustrative and not in a limiting sense.

What is claimed is:

1. A process for producing low oil potato chips, comprising:
   (a) washing potato slices with an aqueous solution;
   (b) applying oil to the washed slices to coat said slices;
   (c) blanching the oil-coated slices at a temperature of about 70°–100° C. (about 160°–212° F.);
   (d) baking the blanched slices at a high temperature of at least about 200° C. (about 390° F.) but below the smoke point of said oil to partially dry the slices to an aqueous moisture content of about 10–25 weight percent; and
   (e) further baking the partially dried slices at a low temperature of about 145°–160° C. (about 290°–320° F.) to finish drying the slices to an aqueous moisture content of about 2 weight percent or less.

2. The process of claim 1 wherein the oil-coated slices are steam blanched at a temperature of about 90°–100° C. (about 194°–212° F.).

3. The process of claim 1 wherein the washing step is comprised of spraying said potato slices with said aqueous solution.

4. The process of claim 3 further including the step of blowing excess solution off of the washed slices with a blast of air prior to applying oil to the slices.

5. The process of claim 1 wherein the oil is applied to the washed slices to at least partially coat the slices with oil and achieve an oil content in the finished low oil potato chips of about 10–25 weight percent.

6. The process of claim 5 wherein excess oil is blown off of the oiled slices with a blast of air prior to the high temperature baking of the slices.

7. The process of claim 1 further including the step of spraying oil onto the chips after the low temperature baking to minimize batch-to-batch variance in the oil content of the chips.

8. A process for producing low oil potato chips, comprising:
   (a) monolayering potato slices on an endless conveyor belt;
   (b) washing the monolayered potato slices with an aqueous solution by spraying the slices with the aqueous solution;
   (c) applying oil to the washed slices to at least partially coat the slices with oil by spraying the monolayered slices with oil;
   (d) blanching the oil-coated, monolayered slices at a temperature of about 70°–100° C. (about 160°–212° F.) for about 1–2 minutes;
   (e) baking the blanched slices at a high temperature of at least about 200° C. (about 390° F.) but below the smoke point of said oil, to partially dry the monolayered slices by reducing the aqueous moisture content of the slices to about 10–25 weight percent; and
   (f) further baking the partially dried slices at a low temperature of about 145°–160° C. (about 290°–320° F.), while the slices are monolayered, to finish drying the slices to an aqueous moisture content of about 2 weight percent or less.

9. The process of claim 8 further including the step of blowing excess solution off of the washed, monolayered slices with a blast of air prior to applying oil to the slices.

10. The process of claim 8 further including the steps of transferring the baked, monolayered chips to a tumbler, and spraying oil onto the chips after the low temperature baking while tumbling the chips during cooling of the chips, to reduce variance in the oil content of the chips.

11. The process of claim 8 wherein the high temperature baking is at a temperature of about 218° C. (about 425° F.).

12. The process of claim 8 wherein during the high temperature baking, the moisture content of the slices is reduced to about 15% by weight.

13. A process for producing low oil potato chips, comprising:
   (a) washing potato slices with an aqueous solution;
   (b) applying oil to the washed slices to at least partially coat the slices with oil;
   (c) blanching the oil-coated slices at a temperature of about 70°–100° C. (about 160°–212° F.);
   (d) forming the blanched slices into a multi-layer, fluidized bed of slices;
   (e) baking the slices in said multi-layer, fluidized bed of slices at a high temperature of at least about 200° C. (about 390° F.) but below the smoke point of said oil to partially dry the slices by reducing the aqueous moisture content of the slices to about 10–25 weight percent; and
   (f) further baking the partially dried slices at a low temperature of about 145°–160° C. (about 290°–320° F.) to finish drying the slices to an aqueous moisture content of about 2 weight percent or less.

14. The process of claim 13 wherein the oil-coated slices are steam blanched at a temperature of about 90°–100° C. (about 194°–212° F.).

15. The process of claim 13 further including the step of blowing excess solution off of the washed, monolayered slices with a blast of air prior to applying oil to the slices.

16. The process of claim 13 wherein the high temperature baking is at a temperature of about 205° C. (about 400° F.).

17. The process of claim 13 wherein the low temperature baking occurs while the slices are in said multi-layer, fluidized bed of slices.

18. The process of claim 17 wherein the low temperature baking is at a temperature of about 150°–160° C. (about 300°–320° F.).

19. The process of claim 17 wherein the low temperature baking is at a temperature of about 150° C. (about 300° F.).

20. The process of claim 13 further including the step of spraying oil onto the chips after the low temperature baking while tumbling the chips during cooling of the chips, to minimize batch-to-batch variance in the oil content of the chips.

21. A process for producing low oil potato chips, comprising:
   (a) monolayering potato slices on an endless conveyor belt;
   (b) washing the monolayered potato slices with an aqueous solution by spraying the slices with the aqueous solution;
   (c) applying oil to the washed slices to at least partially coat the slices with oil by spraying the monolayered slices with oil;
   (d) blanching the oil-coated, monolayered slices at a temperature of about 70°–100° C. (about 160°–212° F.) for about 1–2 minutes;

(e) baking the blanched slices at a high temperature of at least about 200° C. (about 390° F.) but below the smoke point of said oil, to partially dry the monolayered slices by reducing the aqueous moisture content of the slices to about 10–25 weight percent;

(f) forming the partially dried slices into a multi-layer, fluidized bed of slices; and (g) further baking the multi-layer fluidized bed of partially dried slices at a low temperature of about 145°–160° C. (about 290°–320° F.), to finish drying the slices to an aqueous moisture content of about 2 weight percent or less.

22. The process of claim 21 further inclucing the step of blowing excess solution off of the washed, monolayered slices with a blast of air prior to applying oil to the slices.

23. The process of claim 21 wherein the oil-coated slices are steam blanched at a temperature of about 90°–100° C. (about 194°–212° F.).

24. The process of claim 21 wherein the high temperature baking is at a temperature of about 218° C. (about 425° F.).

25. The process of claim 21 wherein during the high temperature baking, the moisture content of the slices is reduced to about 15% by weight.

26. The process of claim 21 wherein the low temperature baking is at a temperature of about 150° C. (about 300° F.).

27. The process of claim 21 further including the step of spraying oil onto the chips after the low temperature baking while tumbling the chips during cooling of the chips, to reduce variance in the oil content of the chips.

* * * * *

UNITED STATES PATENT AND TRADEMARK OFFICE
CERTIFICATE OF CORRECTION

PATENT NO. : 4,756,916

DATED : July 12, 1988

INVENTOR(S) : Mark Dreger et al.

It is certified that error appears in the above-identified patent and that said Letters Patent is hereby corrected as shown below:

Column 8, line 21, "covered" should be --conveyed--.

Signed and Sealed this

Sixth Day of December, 1988

Attest:

DONALD J. QUIGG

*Attesting Officer*  *Commissioner of Patents and Trademarks*